June 5, 1945.  O. K. KELLEY  2,377,696
TRANSMISSION DRIVE
Filed Dec. 15, 1941  3 Sheets-Sheet 2

Inventor
Oliver K. Kelley
By
Blackmore, Spencer & Flint
Attorneys

Patented June 5, 1945

2,377,696

UNITED STATES PATENT OFFICE 2,377,696

TRANSMISSION DRIVE

Oliver K. Kelley, Birmingham, Mich., assignor to General Motors Corporation, Detroit, Mich., a corporation of Delaware Application December 15, 1941, Serial No. 423,051

19 Claims.  (Cl. 74—189.5)

The present invention relates to gearing arrangements combined with fluid turbines in which combinations certain unique advantages are attained in the dividing and the recombining of variable torque values between a variable speed prime mover and a variable speed loadshaft, more particularly in motor vehicles. It relates to multiple ratio drive in such combinations, in which a varying range of overall efficiencies proportional to ratio are provided.

A principal object of the invention is to provide herein forms of such gearing and turbine combinations which yield multiple series of step speed ratio, distributed so as to effect smooth transitions of a scalar torque absorption requirement commensurate with the torque required to be transmitted.

A further object of the invention is to provide a driving assembly of gear units adapted to cooperate through divided torque transmitted between them in part by a fluid turbine unit and recombining the torque in a gear unit of double-reduction planetary form capable of handling high values of low gear torque. This utilization of the double reduction principle in this combination yields exceptional quietness, lower net spinning speeds of the planet gears as compared with other planet gear forms, and enables the designer to make use of an overall ratio pattern in which the step from the lowest ratio to the second speed ratio, and the step from the second speed ratio to the 3rd speed ratio are related in proportion to the torque to be handled.

An additional object is to provide fluid pressure actuation means for two compounded gearing units such that the full requirements for selected drive and neutral in each unit are provided in the operation of a valve for each unit, and such that when the reverse drive unit is made active, one of the forward driving units is non-actuated by the fluid pressure, and the other of the forward drive units is actuated for providing its low speed ratio.

Further objects of my invention will appear in the detailed description following, in connection with the accompanying drawings and from the appended claims.

Figure 1:
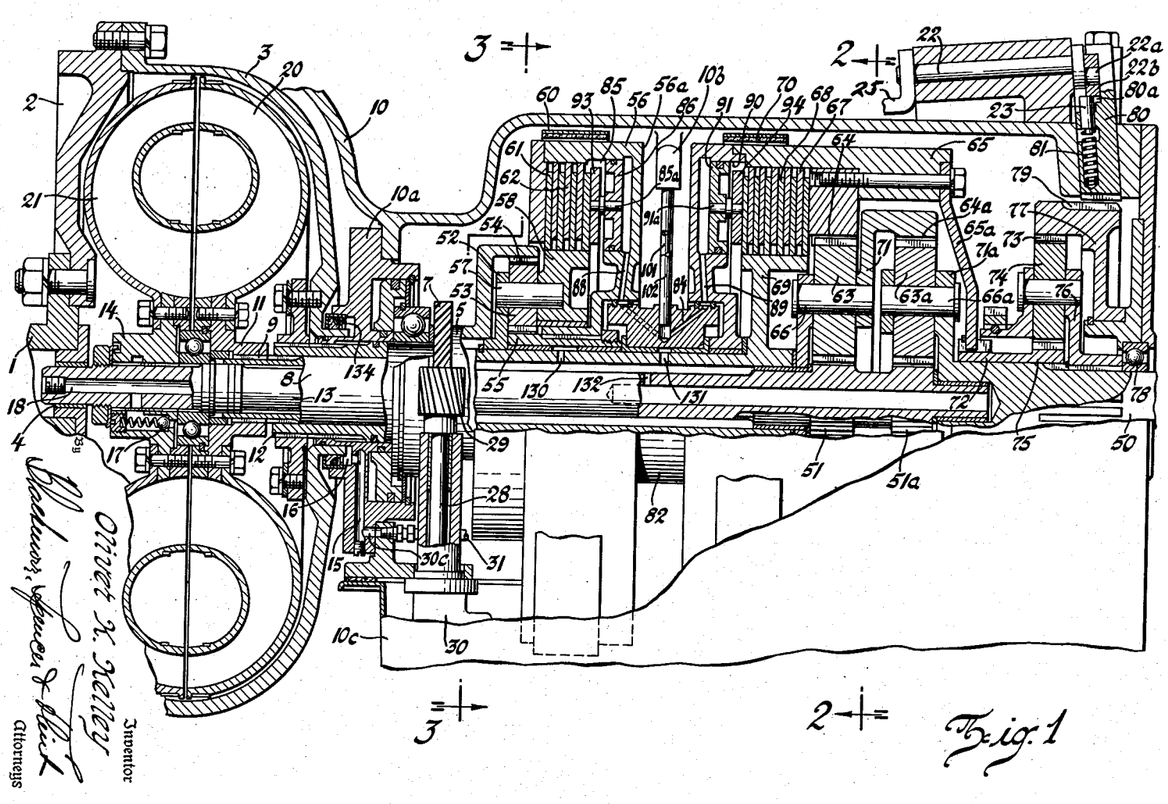
Figure 1 is an elevation section of the transmission arrangement of the invention, showing front, rear and reverse units.

Figure 1 is a vertical elevation section of a complete transmission drive unit embodying the present invention.

In Figure 1 shaft 1 is the engine or prime mover shaft joined to rotate flywheel 2 and attached casing 3 by appropriate bolts or similar means, the pilot bearing 4 supporting shaft 13 attached to hub 14 for the turbine rotor 21 facing mating impeller 20, adapted to be rotated at engine speed or at a reduction thereof by certain elements of the gearing shown. Impeller 20 is attached to hub 11 splined at 9 to hollow shaft 8 surrounding shaft 13, the shaft 8 extending through to the right, being attached to carrier flange 52 and to clutch drum 69.

The gearing arrangement consists of two forward driving units, each yielding two speed ratios, and a reverse drive unit. For convenience, the unit at the left is designated the front unit, embodying annulus gear 54, reaction sun gear 55, planet gears 53 on spindles 57, the carrier 52 to which is attached to clutch drum 58. Brake 60 is arranged to stop the drum 56, of the reaction sun gear 55, for reduction speed drive of carrier 52, impeller 20 and sleeve 8. Annulus gear 54 is driven by drum 3 at engine speed through attached sleeve 5.

The rear unit is composed of the sun gears 51 and 51a, annulus gears 64 and 64a, and carriers 71 and 71a for planet gears 63 and 63a, the carrier 71a being attached to, or integral with output shaft 50. The rear unit is actually two simple planetary groups combined in parallel to produce a ratio of drive not obtainable in practice, with a simple planetary unit.

Shaft 8, as the output shaft of the front unit, terminates in clutch drum 69. Shaft 13 attached to hub 14 of rotor 21, likewise transmits the torque couple carried by the fluid flywheel unit 20, 21 to the two sun gears 51, 51a of the rear unit.

The carrier 71 of the primary gear group 64, 63, and 51 of the rear unit is extended radially in a drum on the inner radial portion of which annulus gear 64a is cut, meshing with planets 63a which mesh also with sun gear 51a. The spindles 66a of planets 63a are fixed in the flange of carrier 71a attached to the output shaft 50.

The drum 65 of annulus gear 64 is stopped by brake 70 to afford reaction for drive through the gears of the rear unit, when the drive is applied by sun gear 51 and 51a. Under these conditions, the applying of brake 70 causes the planets 63 to roll around inside the annulus 64, driving the spindles 66 and carrier 71. At the same time, sun gear 51a is applying a rotational component to the planets 63a. One torque component therefore is applied to annulus 64a by the reaction effect of stopping the annulus gear 64, since the carrier 71 is fixed to the drum of annulus gear 64a; and another component is applied by the sun gear 51a, which, because of the load of the vehicle on shaft 50 and carrier 71a, would endeavor to rotate annulus gear 64a backward. The net result is a combining of torques on carrier 71a, one component being effected through the force on annulus gear 64a, and the other through force applied by sun gear 51a.

To visualize this effect, one may first consider the gear group composed of annulus 64a, planets 63a, sun gear 51a and carrier 71a. Let it be assumed that annulus gear 64a by some means, may be held or stopped from rotation, with rotation force applied only by sun gear 51a. The carrier 71a would then be rotated forward at a definite low speed ratio. But now, instead of holding the annulus 64a from rotation, let a second source of torque be applied to it, so that instead of rotating backward or being stopped, it may enforce a rotation upon the carrier 71a, with means available to prevent sun gear 51a from rotating backward. Since the two sun gears 51, 51a are fixed to the same shaft 13, whatever positive torque exists cannot be differentially applied except by the fixed ratio of the gear group 51, 63, 64 in its imparting a forward component to annulus 64a.

The net speed ratio of the rear unit is therefore the reduction ratio of the secondary group comprising annulus 64a, planets 63a, sun gear 15a and carrier 71a, multiplied by the reduction ratio of the primary group comprising sun gear 51, planets 63, annulus 64 and carrier 71 applied through the annulus 64a of the secondary group.

This unusual form of gear provides in itself a dividing and a recombining of torque between shaft 13 as input, and carrier shaft 50 as output, and as stated, enables a compounded overall reduction ratio to be obtained, not practically obtained by other gearing of this type.

The clutch hub 58 of the front unit is splined to carry internally toothed clutch plates 61, interleaved with clutch plates 62, attached to rotate with drum 56, and when the plates are load-engaged, to set up a couple between sun gear 55 and carrier 52. This causes the front unit elements to rotate at unitary speed with the engine-connected drum 3, along with hollow shaft 8 and impeller 20. Alternate operation of clutch 61—62 and brake 60 therefore results in a direct drive couple, or in a reduction speed ratio in the front unit.

Clutch hub 69 rotating with shaft 8 is splined to carry internally notched clutch plates 68 mating with plates 67 affixed to rotate with drum 65. When these plates are loaded and engaged, a couple is established between annulus gear 64 of the rear unit, through shaft 8, fluid flywheel 20, 21, shaft 13 and sun gear 51 of the rear unit.

Disregarding the differential slip of the fluid flywheel to be discussed later, the closing of clutch 67, 68 couples the rear unit to drive in direct, or at 1 to 1 ratio. Alternate actuation operation of brake 70 and clutch 67—68 therefore provides reduction drive or direct drive coupling of the rear unit.

The front unit reduction gear ratio, because of the simple planetary arrangement, provides, in the present example, a ratio of approximately 1.44; and the rear unit one of 2.22.

Still disregarding the differential slip of the fluid flywheel, the utilization of two different reduction ratios in the two units, one obtained through compounding torque within the rear unit gearing, provides a ratio shift pattern having four forward speed ratios. With both front and rear units in reduction gear, with both brakes applied, the engine torque component can only reach the rear unit by being multiplied in the front unit, and being transmitted through the fluid flywheel and shaft 13, to the rear unit sun gears 51 and 51a. The rear unit annulus 64 and the front unit sun gear 55 being braked, the net overall speed ratio is, in the example, 1.44 multiplied by 2.22, or 3.2.

Now, with the front unit brake 60 released, and clutch 61—62 engaged, the engine drives the fluid flywheel impeller 20 at unit speed, rotor 21 driving the sun gear 51—51a of the rear unit, so that with brake 70 applied to annulus 64, carrier 71 and output shaft 50 are rotated at the reduction ratio of the rear unit, which was noted above as 2.22.

The releasing of brake 70 and engaging of clutch 67—68 of the rear unit, while releasing clutch 61—62 and applying brake 60 of the front unit, couples annulus gear 64 of the rear unit to rotate at the speed of shaft 8, carrier 52 of the front unit, and impeller 20; but since brake 60 of the front unit is applied, the sun gears 51—51a of the rear unit carry a torque component derived through the fluid flywheel, but multiplied by the ratio of the front unit, i. e., in the present example, 1.44.

This ratio is applied to annulus gear 64 of the rear unit, by virtue of the engagement of clutch 67—68, connecting the annulus 64 to carrier 52 of the front unit; and therefore both the sun gear 51 and the annulus 64 of the primary group of the rear unit are driven at the reduction ratio of the front unit gear group. This couple being established in the rear unit with only a small differential slip in the fluid flywheel through which the couple to sun gears 51—51a is carried, the carrier 71a of the secondary group of the rear unit is driven at a ratio of approximately 1.44.

Reviewing the above, we have seen that a range of overall reduction ratios of 3.2, 2.2, and 1.44 is obtainable with the drive arrangement of the invention.

The direct drive couple is achieved by coupling both the front and rear unit clutches 61—62 and 67—68, with releasing of both brakes 60 and 70.

With clutch 61—62 of the front unit now engaged, with brake 60 released, the following elements are driven at engine speed, carrier 52, shaft 8, impeller 20 and annulus 64. A small differential slip in the fluid flywheel could cause sun gears 51—51a of the rear unit to rotate at a slightly different speed than that imparted to annulus 64 of the rear unit, but for all ordinary purposes, the controls for the different ratios would be so arranged that during the drive intervals in which the direct drive couple would be established, this slip effect would be negligible.

To clarify this ratio pattern, and to express it in terms of ratio with respect to clutch and brake actuation, the following table is given, the symbol $x$ being used to indicate the ratio actuation means, brakes or clutches, being actuated:

| Ratio | | Front unit | | Rear unit | |
|---|---|---|---|---|---|
| | | Brake 60 | Clutch 61-62 | Brake 70 | Clutch 67-68 |
| Low | 3.20 | x | | x | |
| 2nd | 2.22 | | x | x | |
| 3rd | 1.44 | x | | | x |
| High | 1.00 | | x | | x |
| Neutral | | | | x | x |

The reverse gear unit shown in Figure 1 comprises sun gear 75, meshing planet gears 74, annulus gear 73, and carrier 76 attached to output shaft 50.

The drum 65 of annulus gear 64 of the rear unit has affixed member 65a attached to sleeve 72 of reverse unit sun gear 75, to apply a component thereto.

The body of annulus gear 73 is extended to the right in drum 77, and also radially inward to provide bearing support at 78, and is toothed externally at 79 for intersection with the toothed reverse gear pawl 80, movable radially into mesh with teeth 79 when reverse gear drive is desired.

To obtain reverse drive, it is necessary to apply brake 60 of the front unit, release both the clutch 61—62 and brake 70 of the rear unit, and seat pawl 80 in teeth 79 of the drum 77 of annulus gear 73.

The reverse gear pawl control is shown in Figure 1.

Since it is not obvious how a reverse ratio of drive may be imparted to reverse gear carrier 76, the method will be described. The front unit brake 60 being applied, and the rear unit having neither brake 70 nor clutch 67—68 active, the fluid flywheel drives shaft 13 forward at low speed. The sun gear 51a of the secondary rear group spins planets 63a, and the carrier 71a being loaded by the vehicle inertia, the annulus gear 64a endeavors to rotate backward. In the primary group of the rear unit the sun gear 51 rotates planets 63 to spin annulus 64 backward, while the carrier 71 tied to annulus gear 64a of the secondary group is also providing a backward, or reverse component.

The net resultant of these components is to rotate the annulus 64, drum 65, member 65a and reverse sun gear 75 reversely. This resultant applied in the reverse gear unit is demultiplied by the ratio of that unit, since its annulus gear 73 is held from rotation by pawl 80, the reverse carrier 76 attached to the output shaft 50 being driven reversely at slow speed.

This is a peculiar and unique effect derived from the differential drive within the rear unit, and the further differential couple between the rear unit and the reverse unit. It will be noted that the carrier 71a of the secondary group of the rear unit, considered first as standing still to provide a reverse component to annulus 64a and to carrier 71 of the rear unit primary group, will actually provide a demultiplied, reverse component since the couple imparted by carrier 71a to annulus 64a is subject to backward rotation of the output shaft itself. There is therefore a differential action between the rear unit and the reverse unit, and a differential action within the rear unit, when drive is in reverse.

This arrangement provides a reverse drive at a low reduction ratio, not otherwise obtainable, with a double reduction gear unit in multiplex gearing combinations of this character.

The mechanism for seating and releasing the reverse gear pawl 80 consists of shaft 22 centered in a bore of an extension of the casing 10, having an eccentric pin 22a and rollers 22b intersecting a slot 80a cut in the outer end of pawl 80. Spring 81 in a recess of pawl 80 presses pin 23 upward against the roller 22b, so that on the engaging stroke when shaft 22 is rotated to seat the pawl 80, the seating force is applied through the spring 81, which permits relative motion between pawl 80 and teeth 79 of drum 77, until the drum 77 may have come to rest, when full tooth seating occurs. The shaft 22 is rocked by arm 25 from a common control for the front and rear unit valving.

To provide proper means for actuating the brakes and clutches, Figure 1 shows pump 30 immersed in the transmission sump, and adapted to deliver oil under pressure to pressure main 31. The pump is driven from shaft 28; gear 29 and mating gear 7 attached to sleeve 5 rotating with engine-connected drum 3.

The pump 30 also provides lubrication for the transmission through the agency of relief valve 30b which feeds pump pressure above a given pressure value to line 30b from whence it is delivered through passages not shown, to the space between shaft 13 and hollow shaft 8, where radial passages 130, 131 and 132 lead to the bearings supporting the transmission elements.

The control web 10b of casing 10 is drilled out for pipes 101 and 102 leading to gland 82, to feed fluid pressure to annulus spaces 82a and 82b of the gland, through passages 83 and 84 respectively.

The rightward endwall of drum 56 of the front unit is formed into cylinders 85 for clutch-engaging pistons 86, the passages 88 intersecting annular space 82a of gland 82. The piston rods 86a seat in recesses in the clutch presser plate 93, so that when fluid pressure is applied through pipe 101, passage 83, space 82a and passages 88 to the cylinders 85, the pistons 86 move leftward compressing the clutch plates 61—62 against each other, backed by the forward endwall 56a of drum 56. The detail of clutch pressure feed passages is given in Figure 1a. Emptying of the fluid pressure in cylinders 85, allows the clutch plates 61—62 to release from each other. A similar action is obtained in the rear unit, fluid under pressure being fed to cylinders 90 through pipe 102, passage 84, space 82b, and passages 89, the pistons 91, rods 91a and presser plate 94 squeezing the stack of plates 67—68 to set up a direct drive couple; release of the pressure releasing the clutch in the same manner.

Brake actuation

Figures 1A, 2, 3:
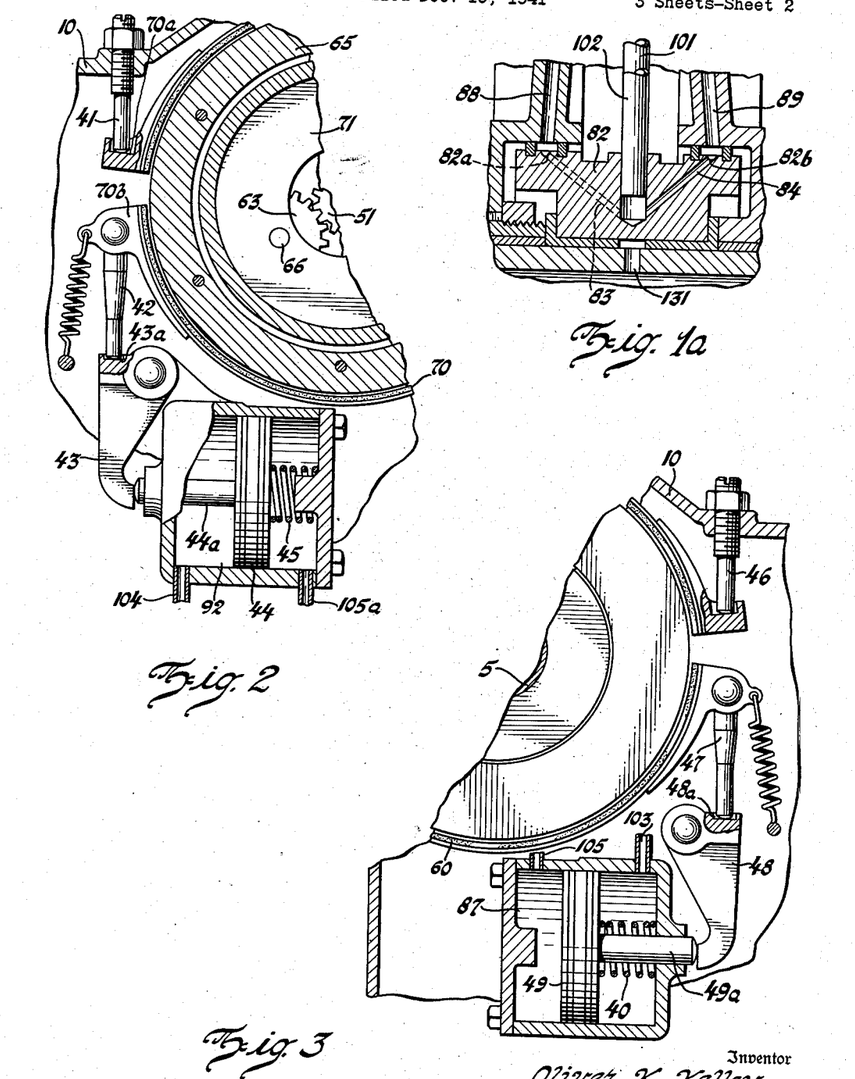
Figure 1a is an enlargement section of the web and gland of Figure 1.
Figure 2 is a schematic diagram in part section of the ratio actuation system for the front unit taken at 2—2 of Figure 1.
Figure 3 is a schematic diagram in part section of the ratio actuation system for the rear unit, taken at 3—3 of Figure 1.

Figure 2 shows a typical section of a brake-actuating servo system, utilizing fluid pressure, for controlling the operation of brakes such as 60 or 70.

In Figure 3, a modification of the arrangement of Figure 2, shows an alternate means to control one of the brakes 60 or 70, wherein a positive neutral drive is obtainable; in the example, brake 60 of the front unit.

For illustration purposes, the arrangement of Figure 2 is shown as for actuating the rear unit of Figure 1, the parts numbers corresponding.

Brake band 70 is wrapped around drum 65, but because of the normal tension therein, will not drag on the drum when the external controls are set to release the brake.

Brake anchor pin 41, adjustable in a boss of casing 10, holds one end of band 70, by engaging a notch in fitting 70a. The movable end 70b of brake 70 is equipped with a pivoted arm 42, the free end of which fits in a notch 43a of crank arm 43 pivoted in casing 10.

Brake cylinder 92, attached to casing 10, accommodates piston 44 and rod 44a, the spring 45 surrounding a fixed guide boss and pressing the piston 44 in a direction to apply the brake 70 by force transmitted through rod 44a, crank arm 43, thrust arm 42, and movable end 70b.

Figure 4:
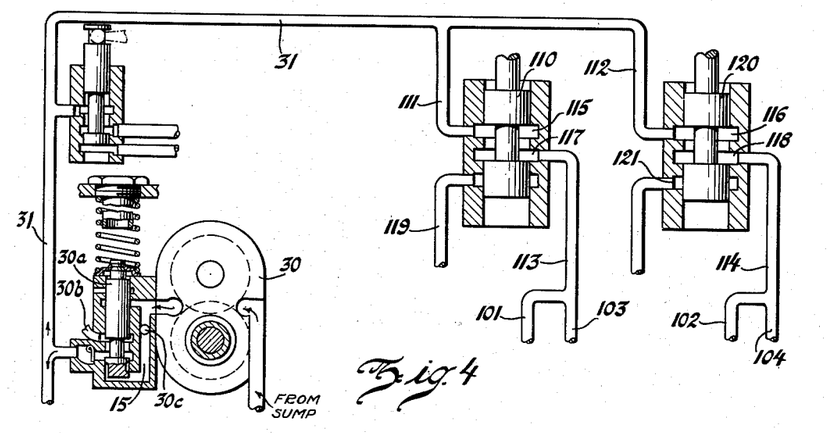
Figure 4 is a diagram of a fluid pressure supply system for the transmission including the pump of Figure 1 and two valves for controlling the application of the fluid pressure to the ratio actuation means of Figures 1, 2 and 3.

Pressure pipe 104, opening into the cylinder 92, may deliver fluid pressure to release the brake 70, by compressing the brake applying spring 45. If desired, pipe 104 may be joined to pipe 102, of Figure 1, as shown in Figure 4 so that a common pressure in pipes 102 and 104 may be utilized to do two things, release the brake 70, and apply the clutch 67—68. It will be seen that a single fluid pressure line is thereby utilized to control the whole action of the rear unit, and that a control valve for this line need only admit pump pressure to the line 114, or release it therefrom, since pipe 104 delivers pressure to take off brake 70.

In Figure 3, the band 60, anchored by pin 46 threaded in casing 10, has pivoted thrust rod 47 engaging a notch 48a in crank arm 48 against which rod 49a of piston 49 may press. Spring 40 in cylinder 87 normally pushes the piston in a direction to release the brake 60.

The control pressure for simultaneously releasing brake 60 while loading the front unit clutch 61—62 for engagement is applied in a direction to assist spring 40.

The external control system therefore must be arranged to furnish fluid pressure force in pipe 105 to act on piston 49 against the force of spring 40, when it is desired to lock brake 60 for reduction gear drive in the front unit. As will be explained further in connection with the control system shown in Figures 5 and 6, the servo distributor valve for the front unit when in a position to vent the right-hand portion of cylinder 87 through passage 103, is arranged to apply pressure to the lower portion of the cylinder, and thereby apply brake 60 to drum 56.

Control system

The distribution control method for the servo actuation pressure may be that described in Letters Patent U. S. 2,204,872 to Earl A. Thompson, issued June 18, 1940; wherein a fully automatic selection of 4 forward speed ratios is described, or it may be arranged in accordance with the disclosure of William L. Carnegie in Letters Patent U. S. 2,221,393, issued November 12, 1940, wherein a manually selected control is described.

Figure 5:
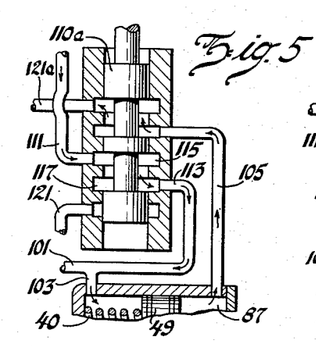
Figures 5 and 5a show a modification of the form of distributor valving of Figure 4, with the valve in one position for establishing a direct drive couple in the transmission unit controlled, and in a second position for establishing drive through the gears of the unit.

The above described valving relationship provides that when either of the valves is in the up position as shown as Figure 4, the pump line pressure in 31 is being delivered to the servo actuation cylinders of the respective unit controlled, to hold off the reduction gear reaction brake, and to hold the coupling clutch engaged for direct drive coupling. Figure 5 therefore shows the controls as establishing top gear or "high," as will be understood from the foregoing ratio table.

The directing valves may be moved in their two-position ranges by mechanical means, fluid pressure or electrical apparatus, as selected by the designer.

In the diagram of Figure 4, the pump 30 feeds oil under pressure to line 31 leading to the pressure input branches 111 and 112, respectively, for the distributor valves 110 and 120 for the front and rear units. Each of the valves 110 and 120 operate alike, having an "up" position for admitting pump line pressure to the two servo actuation lines 113 and 114 respectively, for the front and rear units. In the "down" position, the valves drain the servo lines 113 and 114 to the exhaust lines 119, 121 whence the oil returns to the sump, while the pump pressure is cut off at feed ports 115, 116.

As described herein, the pressure in line 113 is fed to the brake cylinder 87 of the front unit; through line 103, and to the clutch cylinders 85 through line 101. Likewise the servo actuation pressure in line 114 is fed through line 104 to brake cylinder 92 of the rear unit, and to clutch cylinders 90 through line 102.

It will be seen that the presence or absence of pressure in one of the distributing lines 113, 114 is sufficient to establish one of two ratios in each of the front and rear units, to provide 4 forward speed driving ratios.

The ratio driving control for valves 110 and 120 has therefore only simple requirements, a pattern of controlling valve positions such that no pressure exists in either 113 or 114, that pressure may be in one and not the other, or vice versa, or that pressure is active in both servo actuation lines.

Figure 5A:
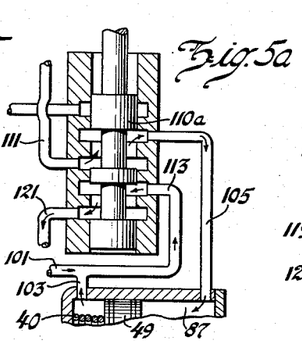

Figures 5 and 5a represent a modification of the form of distributor valves control of Figure 4, in which the arrangement provides fluid pressure loading of the brake such as shown in Figure 3, by valve 110a directing the pump pressure alternately to the cylinder space at either end of the brake piston 49 through passages 103 or 105, the presence of pressure in line 103 effecting the actuation of pistons for loading of clutch 61—62, when the pressure is applied to take off brake 60 positively. Figure 5 shows the flow of pump and exhaust pressures for the condition required of brake release and clutch engagement. Figure 5a shows the flow of pump and exhaust pressure for the brake-applied and clutch released position.

In order to have a control condition in which both the brake and clutch are released for a positive neutral, it is only necessary, with the construction of Figure 3, to provide a valve position in which no pump pressure at all may flow to the servo lines, since spring 40 will hold the brake 60 released, and clutch 61—62 will be disengaged, in the absence of fluid pressure.

Figure 6:
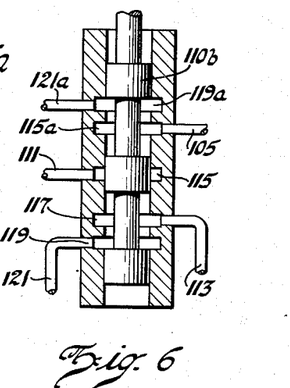
Figure 6 shows a further modification of distributor valve form which provides a third, mid-position control point for holding off both the brake and the clutch of the transmission unit controlled.

A valve and porting arrangement which performs this function at mid-position is shown in Figure 6. A distributor valve 110b and pump port 115, servo feed port 117, servo exhaust port 119, and counter pressure feed port 115a, and exhaust port 119a. The valve 110b is shown in its mid-position, in which the input pressure in line 111 is blocked at port 115, and the spaces in both ends of the brake cylinder 87 are open to exhaust. This valve 110b handles the pressure in the same manner as the valves of Figures 5 and 5a, except that it has a mid-position in which it opens both lines 103 and 105 to exhaust while cutting off the pump line pressure. With this valve controlling the front unit, its three positions in sequence from top to bottom are "clutch engaged—brake off"; "both clutch and brake released"; and "brake applied—clutch released."

The external controls for the positioning of the foregoing pressure distribution valving may be manually and automatically operated, through direct mechanical means or by electrical or fluid pressure energised means.

Neutral and reverse control

In order to provide reverse drive, in the manner explained above, in connection with Figure 1, it is required that both the clutch and brake 70 of the rear unit be maintained released, while the brake 60 of the front unit is applied, with the reverse gear pawl 80 made active to lock annulus drum 77 against rotation.

For this purpose the valving arrangement shown in Figure 6 may be used, combined with the servo brake and piping arrangement of Figure 1, and the reverse locking pawl 80 of Figure 1 operated mechanically for actuation along with the control for applying brake 60 of the front unit.

Figure 7:
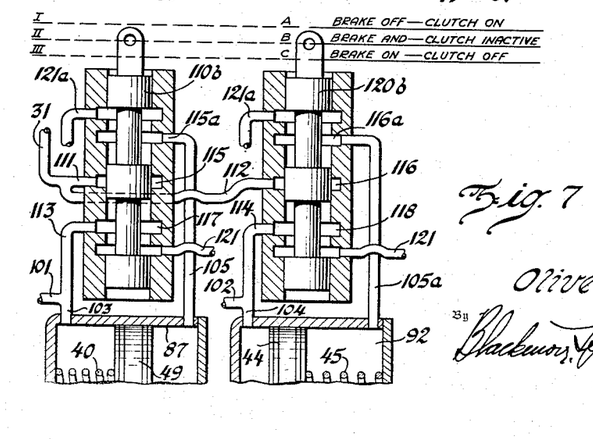
Figure 7 is a diagram describing an application of the valve form of Figure 6 to the controlling of both the front and rear units of Figure 1, so that a complete no-drive or neutral condition of both may be obtained; and providing for non-actuation of both the clutch and the brake of the rear unit of Figures 1 and 2 when it is desired to apply the brake of the front unit, and engage the pawl of the reverse unit, shown in Figure 1.

The arrangement of Figure 7 shows two valves, 110b at the left, 120b at the right. This combination may be utilized to control the two units so that a complete neutral may be obtained through stopping the flow of torque in both front and rear units, and further that when reverse drive is desired, the valve 110b may control the front unit, to lock the brake 60, and valve 120b may control the rear unit to prevent either clutch or brake actuation, at which time the reverse pawl 80 of Figure 1 may be moved to lock the annulus drum 77 against rotation.

The porting for valve 110b is in general the same as for the disclosure of Figure 6, shown in combination with the construction described in Figure 7, the porting being identically numbered; the operations remaining the same.

Valve 120b is shown in conjunction with the construction described in Figure 2 for controlling the rear unit. It may be identical with valve 110b. The valve 120b in mid-position blocks the feed from pump line 112, and as shown, connects both ends of brake cylinder 92, and the clutch feed line 102 to exhaust. In the up position noted at A, the pump pressure is fed from port 116 to line 114, to the clutch actuation line 102, and to the left end of brake cylinder 92, compressing spring 45 and preventing actuation of brake 70 by shifting piston 44 to the right. At the same time the fluid pressure in the right end of cylinder 92 may be relieved to exhaust by port 116a and passage 121a.

Shifting of the valve downward to the position C indicated, applies the pump pressure from port 116 to port 116a, and line 105a to the right end of cylinder 92, augmenting the force of spring 45, while the left end of cylinder 92, and clutch actuation line 102 are connected to exhaust through line 114, port 118 and pipe 121.

The travel of either valve 120b or 110b through the position B may be made as quickly as desired since the form of the valve is in reality of double balanced type, with no reactive blocking resulting from trapping of fluid. Since this action may be made more quickly than the dimensions of the porting and passages can accommodate the flow of fluid, the interval when both the clutch and the brake of the transmission unit are fully released is controllable, and a required overlap of torque between full clutch or brake actuation is therefore only limited by the speed of the valve shift action between the positions A and C.

Assuming the Figure 7 control applied to the construction of Figure 1, the following ratio pattern of valve positions is utilized:

|  | Front unit valve 110b | Rear unit valve 120b | Reverse pawl 80 |
|---|---|---|---|
| Low | III | C | |
| 2nd | I | C | |
| 3rd | III | A | |
| High | I | A | |
| Neutral | II | B | |
| Reverse | III | B | Engaged. |

The transitions between low, neutral and reverse gear drive are of special interest in that for a shift between low and neutral or neutral and reverse, valve 110b makes only one step, while valve 120b only moves when the shift between low and neutral is required, and then only one step from position to position. It is only necessary for any of the ratio shifts, to move two of these controls. For example, the neutral-to-reverse, which requires pawl 80 to be engaged, does not require movement of valve 120b, and only one step of motion of valve 110b.

It is not deemed essential to show external mechanism for operating the ratio control valves of Figures 4 to 7, since the various methods of positioning valving of this character are well-known. However, by way of example, it is herein stated that a cam plate control such as provided in United States Letters Patent No. 2,221,393 to William L. Carnegie, for Variable speed control, is directly adaptable to the manipulation of the two valves 110b and 120b of Figure 7, in accordance with the positioning pattern given above. Likewise this shift pattern may be controlled for automatic selection of ratio by a governor of flyball or fluid pressure type, and having intervening or interfering means to vary the governor action for providing a range of ratio shift points in accordance with the driving conditions, as is also well-known.

To obtain a progressive sequence of ratios from low to highest forward speed ratio, utilizing the two valves shown in Figure 7 to control the two units of Figures 1 and 2, it is essential that valve 110b shift from positions III to I, to III and back to I, in that order, while valve 120b remains in position C for the two lower steps and then shifts to A for the two upper steps, inverting this sequence for downshift.

Differential fluid coupling

The fluid flywheel unit described and utilized in this specification is shown in detail in the co-pending U. S. Letters Patent application to Earl A. Thompson, Serial Number 317,348, filed February 5, 1940, and is of a specialized type which provides high overall torque efficiency as distinct from other types.

The transfer of torque by or to the torque capacity of a fluid flywheel may, because of use requirements of the drive in which installed, need to be relatively inefficient at low impeller speeds, in order to pick up the inertia of a stopped vehicle, since common internal combustion engines do not furnish high torque at low speeds, and the driving medium, i. e., the fluid flywheel, must therefore not (at low speed) transmit the torque efficiently, or else the engine would be stalled by the load of the vehicle. The use of a form of fluid flywheel which is inefficient until rotated at some higher speed at which the engine power developed is high enough to avoid stalling, introduces power losses which are circumvented if other means may be found to avoid stalling while making use of a more efficient fluid flywheel unit.

The fluid flywheel shown herein is of high efficiency type, with losses at a minimum due to features set forth in the above-noted application by Earl A. Thompson.

The use of a high-efficiency fluid turbine unit, placed directly between the engine and the transmission, as a partial substitute for a main friction clutch, has the drawback that unless other means are used to disconnect or uncouple the engine from the load shaft, an objectionable creeping of the vehicle will occur, unless the vehicle brakes be applied, or a separate braking means be utilized for the turbine driven member.

The fluid flywheel unit is mounted at the left, the rotor 21 being attached to hub 14, fixed to shaft 13, and impeller 20 to hollow shaft 8. The problem of maintaining the efficiency of this unit requires that it be kept filled while running, therefore bearing 4 seals off leakage at the forward projection of shaft 13, and seal 134 seals between the lip of drum 3 and the extension web 10a of casing 10.

This unit is fed from the pump at passage 30c, through passages 15 and 16, via splines 12 where the liquid fills the space inside drum 3 and surrounding the members 20 and 21. Overpressure in the working space of the rotors is relieved by check valve 17 mounted in hub 14 which permits oil to flow into central passage 18 in shaft 13, from where it may be admitted to the space inside hollow shaft 13 to be used to lubricate the transmission bearings, or else led back to the sump space enclosed by pan 10c, to be recirculated by pump 30. At rest, the fluid flywheel always remains at least full to the shaft line, so that when the engine driving drum 3 is started, the pump rapidly fills the space inside the drum which drives the hollow sleeve 5 of annulus gear 54.

In my U. S. Letters Patent No. 2,176,138, filed Feb. 5, 1937, and issued October 17, 1939, is shown the fluid flywheel utilized as an interstage coupling between drive coupling elements of two transmission units, with a particular gear arrangement for obtaining multiple speed ratios. A further disclosure of this general character appears in my U. S. Letters Patent No. 2,211,233, filed April 10, 1939, and issued August 13, 1940. In the latter, an improvement in ratio compounding is shown by which the compound differential drive factor does not appear in the forward drives, but only in reverse drive. The present disclosure resembles the latter in that respect, but provides a double-reduction gear in the rear unit, with the reverse gear combination above noted, in which a compound differential drive action is obtained, yielding advantages enumerated elsewhere in this specification.

In accordance with the foregoing described invention, certain peculiar and unique advantages are provided in driving mechanism for vehicles, arranged to yield compound, differential speed ratios in forward and reverse drive, cushioned by the action of a constantly filled fluid flywheel, and additional advantages in fluid pressure actuation and control for obtaining complete cyclic ratio drive and release of drive in multiple unit controls wherein the required pattern of drive in the multiple units calls for an intermediate unit of a multiple group to be free from torque while the other units are coupled for drive.

Further advantages are typified in the foregoing description, and in the appended drawings and claims.

What I claim as new and novel is:

1. In power transmissions, for motor vehicles, an engine shaft and a load shaft, a first planetary gear unit comprising an annulus gear coupled directly to said engine shaft, a reaction sun gear and drum adapted to be stopped from rotation by a brake and planet gears mounted on a carrier arranged to be clutched to said drum for transmitting drive through said unit at unitary speed; a clutch for connecting said carrier and said drum, a second planetary gear unit comprising two differentially coupled planetary gear groups the primary group of which comprises a carrier, a sun gear, planet gears supported for rotation on said carrier, an annulus gear arranged to be coupled to and uncoupled from the carrier of said first unit or to be stopped from rotation by a brake, the secondary group of which comprises an annulus gear fixed to rotate with the carrier of said primary group, a sun gear fixed to rotate with the sun gear of said primary group, and planet gears supported for rotation on a carrier fixed to a load shaft, a second clutch for connecting the annulus gear of said second unit and the carrier of said first unit, and fluid turbine coupling means connecting the carrier of said first unit with the sun gears of said second unit and adapted to transmit a divided torque component therebetween when the annulus gear of said primary group is coupled to said first unit carrier.

2. In power transmissions, for motor vehicles, an engine shaft, a load shaft, a planetary gear unit composed of a compound primary and a secondary planetary gear group, each comprising an annulus gear, a sun gear and meshing planet gears supported on a carrier, connections joining the sun gears of said groups together and the carrier of the primary group with the annulus of the secondary group, actuable reaction supporting means for preventing rotation of the annulus gear of said primary group, the carrier of said secondary group being joined to said load shaft; a gear unit coupled to said engine shaft and having a driven element, means to couple said annulus gear of said primary group with said driven element, and a fluid turbine unit adapted to connect said driven element with the connected sun gears of said compound planetary gear unit for transmitting differential torque therebetween when said coupling means is effective, and adapted to transmit full torque between said element and said connected sun gears when said coupling means is ineffective and said reaction supporting means is actuated.

3. In power transmission devices for motor vehicles, an engine shaft, a load shaft, a first planetary gear unit driven by said engine shaft and having a driven element; a compound planetary gear unit comprising a primary and a secondary group, each group including force, reaction and resultant elements, the force elements of the groups being sun gears of equal diameter and fixed to rotate together, the resultant element of said secondary group being attached to said load shaft; a connection between the resultant element of the primary group and the reaction element of the secondary group for providing recombining of torque therebetween, and reaction supporting means for preventing rotation of the reaction element of said primary group to superimpose a torque component of said primary group upon the reaction element of said secondary group, for imparting a differential speed ratio thereto when said force elements are rotated, a fluid turbine drive device having relatively rotatable vane wheels which couple the driven element of said first gear unit with the dual force elements of said compound gear unit, and means to couple and uncouple said reaction element from the drive of said first unit alternately actuable with the said reaction supporting means operative to establish a divided torque passing through the said device and recombined in the said compound gear unit when said coupling means is made effective, and said reaction supporting means is made ineffective.

4. In power drives, for motor vehicles, an engine shaft, a multiple planetary transmission gearing assembly comprising; a first planetary gear unit driven by said engine shaft and having a driven element, drive establishing means for said unit, a second planetary gear unit driving said load shaft and composed of primary and secondary gear groups differentially coupled and having an element of each fixedly connected for obtaining differential speed ratio drive by second unit, ratio coupling means between an element of said primary group and the driven element of said first gear unit adapted to be released and engaged, control means operative to engage and disengage said coupling means, and a fluid turbine coupling connecting said driven element of said first unit and one of said fixedly coupled elements of said second unit effective to transmit a differential torque therebetween when said control means is made operative to engage said coupling means.

5. In power drives, for motor vehicles, an engine shaft, a load shaft, a compound planetary gear unit adapted to transmit the power of said engine shaft to said load shaft comprising primary and secondary gear groups arranged for differential drive by fixedly coupling the force elements of each group together as one, by fixedly coupling the reaction element of the secondary group with the resultant element of the primary group, by affixing the resultant element of the secondary group to the load shaft and by arranging the reaction element of the primary group to be rotated or held from rotation, rotation preventing means for said reaction element, a reversing planetary gear unit having a reaction element adapted to be held from rotation, an output element fixed to said load shaft and a third element rotating with the reaction element of said compound gear unit, holding means for the said reaction element of said reversing gear unit, drive establishing means adapted to couple said engine shaft with the said compound gear unit, and control means operative to make said drive establishing means and said holding means effective whereby the speed ratio of drive in reverse of said output shaft is differentially derived through the co-action of the elements of said units and is a substantially reduced speed ratio with respect to the speed of said engine shaft.

6. In power transmissions, for motor vehicles, an engine shaft, a load shaft, a first gear unit driven by said engine and driving a driven element at variable speed ratio, ratio determining means for said unit, a second gear unit driving the said load shaft, comprising two compounded gear groups having a common input shaft and coupled together through an element of each group, an element of one of said groups adapted to establish reaction support for drive through the gears of said second unit and thereby establish a differential of speed ratio drive of said load shaft, a brake for said reaction element, controllable coupling means for causing said driven element to rotate as one with said reaction supporting element; a third gear unit having an output element connected to said load shaft, a reaction element adapted to be held against rotation and an element connected to and rotating the reaction element of the second gear unit, holding means for the reaction element of said third unit, a fluid flywheel unit providing a parallel coupling between the driven element of said first gear unit and the common input shaft of said second gear unit when said coupling means is coupled, to effect a division of torque between the first and second of said units, and control means operative to cause simultaneous actuation of the ratio determining means for the said first gear unit with actuation of the holding means for the reaction element of the said third unit while preventing actuation of said second unit reaction brake element and of said controllable coupling means between said driven element and said reaction supporting element.

7. In power transmissions, for motor vehicles, an engine shaft, a load shaft, a multiple step-ratio transmission assembly coupling said shafts and embodying at least two fluid pressure actuated units each unit having a brake and a clutch to be actuated for drive through gearing or for direct drive by said unit, fluid pressure actuated means for releasing and for applying said brakes, fluid pressure actuated means for holding said clutches engaged, a fluid pressure supply pump, fluid pressure lines connected to each of said units each having one branch for delivering fluid pressure to engage the clutch and disengage the brake of the unit, a fluid pressure actuation line connected to provide actuation of the brake of one of said units, and a valve connected to said pump and to said lines adapted to control that one of said units, the valve being effective for actuation of the said brake, in another position to deliver pressure to hold off said brake while holding the clutch of that unit engaged, and in a position between the two aforesaid positions to disconnect the pump from both the clutch and the brake delivery lines.

8. In the combination set forth in claim 1, the sub-combination of separate fluid pressure actuation means for the brake and the clutch of the first named unit, and the brake and the clutch of the said second named unit, a source of fluid pressure, and valving controlling the admission of said fluid pressure to one of the said actuation means for one of the units and arranged to select alternate actuation of the brake or clutch of that unit, or to prevent actuation of either.

9. In the combination as described in claim 2, the sub-combination of separately controllable fluid pressure actuation means for said reaction supporting means and for said coupling means, a source of fluid pressure, valving controlling the admission of fluid pressure to said actuation means, and unitary control for said valving.

10. In the combination as described in claim 4, the sub-combination of fluid pressure actuation means for operating said ratio coupling means controlled by said control means, and of fluid pressure actuation means for said drive-establishing means of said first gear unit, likewise controlled by said control means.

11. In the combination of claim 5, the sub-combination of control means for the said drive establishing means, the said holding means and the said reaction element rotation preventing means operative to cause actuation of said drive establishing means and said holding means while preventing actuation of said reaction element rotation preventing means.

12. In the combination set forth in claim 7, the sub-combination of a fluid turbine coupling effective to provide a differential torque path between elements of said multiple step-ratio transmission units.

13. In the combination as described in claim 7, the sub-combination of a fluid turbine coupling effective to provide a differential torque path between elements of said units, means to feed fluid pressure to the working space of said fluid turbine coupling fed from said fluid pressure supply pump which supplies the said valve controlling said units.

14. In the combination set forth in claim 5, the sub-combination of means operative by fluid pressure to apply and hold applied the reaction element of said primary group, while said reaction element of said reversing gear unit is made effective by said control means.

15. In the combination set forth in claim 6, the sub-combination of means operating by fluid pressure and controlled by said control means, adapted to establish actuation of said ratio determining means for the said first gear unit when the said holding means for the reaction element for said third unit is made active.

16. In the combination set forth in claim 7, the sub-combination of a second valve to control the actuation of the brake and the clutch of another of said units, and having one position in which it delivers brake actuation pressure, a second position for delivering clutch actuation pressure and a third position in which it prevents pressure from actuating either the said brake and clutch when placed in a position between the first two named positions, said valves being adapted for common actuation.

17. In multiple planetary gearing including compounded trains between power and load shafts coupled by actuation of reaction brakes and friction clutch couplings of multiple gear units for providing differential ratios of drive between said shafts made effective by a fluid turbine coupling arranged to couple elements of adjacent gear units; the combination of plural fluid pressure actuation systems for said reaction brakes and said friction clutch couplings, one of said actuation systems being controlled by a single valve movable to direct fluid pressure for actuating the reaction brake or the friction clutch coupling of one of said units, thereby varying the torque transmitted by said fluid coupling, said valve being movable to prevent said fluid pressure from actuating either of said reaction brake or said friction clutch coupling, and operator control means for said valve.

18. In the combination set forth in claim 17, the sub-combination of a second controlling valve for another of said gear units such as described in that claim, and control means for said first and second named valves yielding a range of forward step ratio drives between said power and said load shafts in a predetermined ascending and descending sequence, the combination settings of said valves providing for separate prevention of actuation of either of said gear units.

19. In power transmissions for motor vehicles, an engine shaft, a load shaft, a variable speed transmission assembly for coupling said shafts, a casing for said assembly, a plurality of coupling and reaction sustaining means of said assembly operable to establish a range of driving speed ratios of said load shaft including a toothed element of said assembly rotatable idly when said means operate to establish forward drive but adapted to be locked against rotation for establishing reverse drive; and controls for said means including a non-rotating pawl member slidable in an aperture of said casing and movable into mesh with said toothed element for locking same against rotation, an eccentric mechanism arranged to control said member for meshing it with or demeshing from said toothed element, a spring, and a plunger movable by said mechanism and adapted to apply a variable force to said spring for loading said member for meshing engagement with said toothed element, the said spring yielding to permit relative motion of said toothed element and reciprocation of said member during initial engaging action of said member.

OLIVER K. KELLEY.